United States Patent
Zahn et al.

(10) Patent No.: US 8,776,003 B2
(45) Date of Patent: Jul. 8, 2014

(54) SYSTEM AND METHOD FOR EMPLOYING SIDE TRANSITION TIMES FROM SIGNOFF-QUALITY TIMING ANALYSIS INFORMATION TO REDUCE LEAKAGE POWER IN AN ELECTRONIC CIRCUIT AND AN ELECTRONIC DESIGN AUTOMATION TOOL INCORPORATING THE SAME

(75) Inventors: Bruce E. Zahn, Allentown, PA (US); Donald J. Wingate, Laurys Station, PA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/563,145

(22) Filed: Jul. 31, 2012

(65) Prior Publication Data

US 2014/0040845 A1    Feb. 6, 2014

(51) Int. Cl.
*G06F 17/50*    (2006.01)
*G06F 9/455*    (2006.01)

(52) U.S. Cl.
USPC ........... 716/133; 716/108; 716/109; 716/113; 716/120; 716/132; 716/134; 703/13; 703/14

(58) Field of Classification Search
USPC ................. 716/108–109, 113, 120, 132–134; 703/13–14
See application file for complete search history.

(56) References Cited

U.S. PATENT DOCUMENTS

| | | |
|---|---|---|
| 5,471,415 A | 11/1995 | McClure |
| 5,539,894 A | 7/1996 | Webber |
| 5,893,146 A | 4/1999 | Pickett |
| 6,000,017 A | 12/1999 | Hayek et al. |
| 6,122,709 A | 9/2000 | Wicki et al. |
| 6,412,044 B1 | 6/2002 | Kung |
| 6,438,641 B1 | 8/2002 | Kanno et al. |
| 6,449,694 B1 | 9/2002 | Burgess, Jr. et al. |
| 6,493,797 B1 | 12/2002 | Lee et al. |
| 6,553,457 B1 | 4/2003 | Wilkins et al. |
| 6,591,341 B1 | 7/2003 | Sharma |
| 6,603,680 B2 | 8/2003 | Kanamitsu et al. |
| 6,834,327 B2 | 12/2004 | Lyon |
| 6,836,826 B2 | 12/2004 | Sharma |
| 6,862,660 B1 | 3/2005 | Wilkins et al. |
| 6,880,044 B2 | 4/2005 | David |

(Continued)

OTHER PUBLICATIONS

Bellas, N., et al., "Using dynamic cache management techniques to reduce energy in a high-performance processor," ACM, Proceedings of the 1999 International Symposium on Low Power Electronics and Design, Aug. 16-17, 1999, pp. 64-69.

(Continued)

*Primary Examiner* — Nghia Doan

(57) ABSTRACT

The disclosure provides leakage power recovery that considers side transition times of multi-input cells. In one embodiment, a leakage power recovery system is disclosed that includes: (1) a power recovery module that considers side transitions when making a first conditional replacement of a cell in a path of a circuit design with a lower leakage cell and estimates delays and slack of the at least one path of the circuit design, and (2) a speed recovery module that makes a second conditional replacement of a slower lower leakage cell of the path with a higher leakage cell when there is a timing violation with respect to the path, determines if any other cells of the at least one path has a slower input transition and makes a third conditional replacement of a driver thereof to a higher leakage cell when the driver is one of the slower lower leakage cells.

22 Claims, 3 Drawing Sheets

(56) References Cited

U.S. PATENT DOCUMENTS

| | | |
|---|---|---|
| 6,925,579 B2 | 8/2005 | Pawlowski |
| 7,089,375 B2 | 8/2006 | Pawlowski |
| 7,188,325 B1 | 3/2007 | Evers et al. |
| 7,251,797 B2 | 7/2007 | Becer et al. |
| 7,366,997 B1 | 4/2008 | Rahmat et al. |
| 7,448,009 B2 | 11/2008 | Pundoor |
| 7,644,235 B2 | 1/2010 | Pawlowski |
| 7,689,942 B2 | 3/2010 | Acar et al. |
| 8,196,086 B2 | 6/2012 | Brown et al. |
| 2008/0244476 A1 | 10/2008 | Fotakis et al. |
| 2010/0050144 A1* | 2/2010 | Zahn ................ 716/9 |
| 2010/0153897 A1* | 6/2010 | Zahn ................ 716/9 |
| 2012/0221995 A1* | 8/2012 | Zahn et al. ............ 716/134 |

OTHER PUBLICATIONS

Ghose, K., et al., "Reducing Power in Superscalar Processor Caches Using Subbanking, Multiple Line Buffers and Bit-Line Segmentation," Proceedings of the 1999 International Symposium on Low Power Electronics and Design, Aug. 16-17, 1999, pp. 70-75.

Petrov, P., et al., "Data Cache Energy Minimizations Through Programmable Tag Size Matching to the Applications," International Symposium Synthesis, pp. 113-117, 2001.

* cited by examiner

SYSTEM AND METHOD FOR EMPLOYING SIDE TRANSITION TIMES FROM SIGNOFF-QUALITY TIMING ANALYSIS INFORMATION TO REDUCE LEAKAGE POWER IN AN ELECTRONIC CIRCUIT AND AN ELECTRONIC DESIGN AUTOMATION TOOL INCORPORATING THE SAME

CROSS-REFERENCE TO RELATED APPLICATION

This application is related to the following applications: U.S. patent application Ser. No. 12/198,030, filed by Zahn on Aug. 25, 2008, entitled "System and Method for Employing Signoff-Quality Timing Analysis Information to Reduce Leakage Power in an Electronic Circuit and Electronic Design Automation Tool Incorporating the Same," and U.S. patent application Ser. No. 12/333,288, filed by Zahn on Dec. 11, 2008, entitled "System and Method for Employing Signoff-Quality Timing Analysis Information Concurrently In Multiple Scenarios To Reduce Leakage Power In An Electronic Circuit And Electronic Design Automation Tool Incorporating the Same." Both of these patent applications are commonly assigned with this application and incorporated herein by reference in their entirety.

TECHNICAL FIELD

The disclosure relates to, in general, integrated circuits (ICs) and, more specifically, to employing signoff-quality timing analysis information to reduce leakage power in an electronic circuit such as an IC.

BACKGROUND

Power consumption is a concern in most circuit designs, particularly those that are to be battery-powered. Circuit designs should achieve the lowest possible power consumption while achieving defined performance targets. Timing is a major concern in all IC designs, because circuits will not operate properly unless signals can propagate properly through them. Consequently, "timing signoff" is a required step in the designing of a circuit, particularly an IC, and involves using a signoff analysis tool to determine the time that signals will take to propagate through the circuit. If propagation time is inadequate, critical paths in the circuit may have to be modified, or the circuit may have to operate at a slower speed. Power and timing objectives are often at odds; faster devices usually require more power than slower devices, and vice versa.

Electronic design automation (EDA) tools, a category of computer aided design (CAD) tools, are used by electronic circuit designers to create representations of the cells in a particular circuit and the conductors (called "interconnects" or "nets") that couple the cells together. EDA tools allow designers to construct a circuit design and simulate its performance using a computer and without requiring the costly and lengthy process of fabrication. EDA tools are indispensable for designing modern, very-large-scale integrated circuits (VSLICs). For this reason, EDA tools are in wide use.

Many EDA tool companies offer EDA tools that perform both power and timing optimization. These combined power and timing optimization tools employ approximate circuit models and parameters to represent the circuit design and are used well before timing signoff. Timing signoff then becomes an iterative process of using the signoff analysis tool to analyze timing on an accurate representation of the finished circuit design, re-optimize for power and timing using the combined optimization tool and reanalyze using the signoff analysis tool until further optimization becomes unfruitful. Some EDA tool companies offer power optimization tools that run in conjunction with the signoff analysis tool. However, these power optimization tools must be integrated into timing signoff, requiring users to purchase and learn the additional power optimization tool to design a circuit and creating coordination issues between the power optimization tool and the signoff analysis tool which require additional turnaround time to resolve. Such power optimization tools also do not readily adapt to requirements specific to a particular circuit design.

SUMMARY

One aspect provides a leakage power recovery system. In one embodiment, the leakage power recovery system includes: (1) a power recovery module configured to consider side transitions when making a first conditional replacement of a cell in at least one path in a circuit design with a lower leakage cell and estimate delays and slack of the at least one path of the circuit design and (2) a speed recovery module associated with the power recovery module and configured to make a second conditional replacement of a slower lower leakage cell of the at least one path with a higher leakage cell when there is a timing violation with respect to the at least one path, determine if any other cells of the at least one path has a slower input transition and make a third conditional replacement of a driver thereof to a faster higher leakage cell when the driver is one of the slower lower leakage cells.

In another aspect, a leakage power recovery method is disclosed. In one embodiment, the method includes: (1) considering, employing a processor, side transitions when making a first conditional replacement of a cell in at least one path in a circuit design with a lower leakage cell, (2) estimating delays and slack of the at least one path of the circuit design, (3) determining if there is a timing violation with respect to the at least one path, (4) making a second conditional replacement of a slower lower leakage cell of the at least one path with a higher leakage cell when there is a timing violation with respect to the at least one path, (5) determining if any other cells of the at least one path has a slower input transition and (6) making a third conditional replacement of a driver thereof to a faster higher leakage cell when the driver is one of the slower lower leakage cells.

In yet another aspect, an electronic design automation tool is disclosed. In one embodiment, the electronic design automation tool includes: (1) circuitry for considering side transitions when making a first conditional replacement of a cell in at least one path in a circuit design with a lower leakage cell, (2) circuitry for estimating delays and slack of the at least one path of the circuit design, (3) circuitry for determining if there is a timing violation with respect to the at least one path, (4) circuitry for making a second conditional replacement of a slower lower leakage cell of the at least one path with a higher leakage cell when there is a timing violation with respect to the at least one path, (5) circuitry for determining if any other cells of the at least one path has a slower input transition and (6) circuitry for making a third conditional replacement of a driver thereof to a faster higher leakage cell when the driver is one of the slower lower leakage cells.

BRIEF DESCRIPTION

Reference is now made to the following descriptions taken in conjunction with the accompanying drawings, in which.

DETAILED DESCRIPTION

Though some EDA companies offer tools for power optimization and timing optimizations, these tools are limited in achieving maximum leakage power optimization because they are not run in a signoff environment. Described herein are various embodiments of a system and method for employing signoff-quality timing analysis information to reduce leakage power in an electronic circuit, such as an IC.

One embodiment of the method, referred to herein as a leakage power recovery method, is carried out during timing signoff to achieve improved, perhaps optimal, leakage power levels while preserving the timing performance of the circuit design. In one embodiment, the leakage power recovery method disclosed herein addresses the transition times on side pins of multi-input cells (i.e., side transitions) that are part of critical timing paths of a circuit design. As such, driver cells for slow input pins can be replaced to improve timing margin and allow greater power recovery. Additionally, the leakage power recovery method considers the side transitions to allow employing fewer high leakage cells during a speed recovery process.

Output transition times are a function of input transition times and output load. As such, multiple input cells are typically handled in a special way during leakage power recovery processes. There are many output transitions that can occur; one for each input pin. However, due to the large amount of computations required to store all of the output transitions and then propagate all of these transitions forward in a circuit, a static timing analysis (STA) tool often computes the worst case (i.e., minimum and maximum) transitions for forward propagation. This can lead to pessimistic timing analysis. As such, many STA tools have a capability to recalculate critical timing paths using the correct transition times in a "path based analysis" approach.

Figure 4:
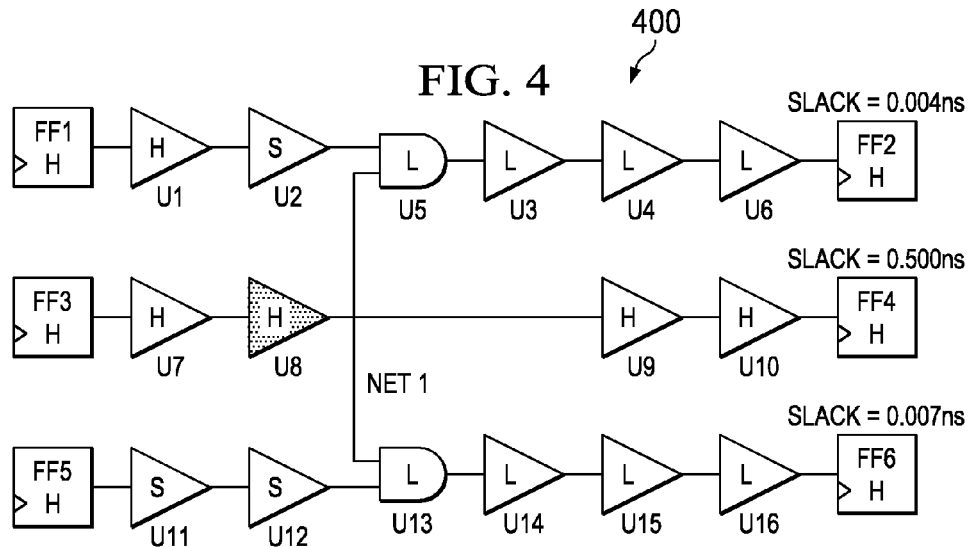
FIG. 4 is a schematic diagram of a portion of an example circuit illustrating operation of the power recovery process of FIG. 2.

For example, FIG. 4 illustrates a schematic diagram of a portion of a circuit 400 having a timing path from FF1 to FF2 that passes through the top pin of a multiple input cell "U5". FIG. 4 is a simple circuit developed to illustrate a principle according to the disclosure. In the illustrated circuit of FIG. 4, all elements shown are cells. In this case FF1 through FF6 are flip flop cells, U5 and U13 are AND gates and the rest are inverters. One skilled in the art will understand that the same principles illustrated by FIG. 4 also apply to other types of cells.

The transition time of the top input pin of U5 (driven by cell U2) is faster than the transition time of the bottom input pin of U5 which is driven by cell U8. Thus, in one analysis process, a STA tool will use the worst case transition time of all the inputs to U5 for calculating the transition time on the output pin of U5. This will result in the delays of all of the cells and wires within the output logic cone of U5 (e.g., U3, U4, U6,) to be slower than if the actual transition from cell U2 were considered in a "path based analysis" approach.

In this particular example, the slower transition from cell U8 is a large contributor to the minimal slack available at endpoint cell FF2. If the path from FF1 to FF2 is recalculated with the actual transition times as in a path based analysis approach, the path will meet timing requirement with improved slack margin. However, it is not feasible to recalculate all the paths in typical designs being done today due to the large amount of resources required (e.g., CPU and memory). Therefore, in some embodiments only the critical paths of a circuit design are typically recalculated.

FIG. 4 includes cell types "H," "S" and "L." The "H" cell type refers to a relatively high threshold voltage $V_t$ cell that propagates transitions relatively slowly but has a relatively low leakage. The "S" cell type refers to a standard $V_t$ cell that propagates transitions faster than the "H" cell type but also has a higher leakage than the "H" cell type. The "L" cell type refers to a relatively low $V_t$ cell that propagates transitions relatively quickly but has a relatively high leakage. Consider the cell U8 in FIG. 4 and assume that prior to power optimization the worst timing path through cell U8 is from path FF3 to FF4 and that this path has a large amount of timing margin. During one power optimization process, cell U8 would be changed to a lower leakage cell type (labeled "H") with the smallest output drive cell size that satisfies the maximum capacitance and transition requirement. Often these smaller cells are beneficial to reduce area as well as dynamic power. However, a smaller, high voltage threshold cell type that slows delay and transition times can create unwanted affects on input pins (e.g., side pins) it drives.

For example in FIG. 4 the output transition time on net "NET1" of circuit 400 is the input to multiple input cells "U13" and "U5". NET1 connects the output of cell U8 to cells U5, U9 and U13. Due to the way output transition times are often calculated using the worst input transition time, the transition time of U8 causes timing failures on timing paths from FF1 to FF2 and FF5 to FF6. One way to fix these timing violations is to change many cells in front of the transition time to faster cells (i.e., higher leakage and higher drive strength) that results in an increase of both dynamic and leakage power.

The disclosure provides an improved leakage power recovery process that considers side transitions by, for example, identifying side transition drivers of cells in critical timing paths that provide the contributing transition (i.e., the slowest transition of the input pins) for the output transition of the critical timing path cells. In one embodiment, the leakage power recovery process determines which of the side transition drivers to replace based on heuristics. The side transition drivers for the side pins of the critical timing path cells are then changed to $V_t$ cells with a faster transition. While these cells have higher leakage the leakage power recovery process examines if this higher leakage is offset by the timing margin created by the change such that cells in the fanout will offset this. For example, in an automated approach, the disclosed leakage power recovery method is performed in the timing signoff environment by identifying weak cells that drive these side input pins (i.e., weak side transition drivers) of critical timing paths and changing the identified driver cells to improve the timing margin of associated paths. A weak cell is typically a cell having drive strength that is less than X2, wherein X2 drive strength is achieved with twice the width of transistors within the driver. By improving the timing margin of paths, more candidate cells of the circuit design are provided for replacement. As such, greater power recovery can be achieved when compared to conventional leakage power recovery methods.

In addition to performing initial cell changes to provide additional timing margin that allows greater power recovery, the improved leakage power recovery method also provides an improved speed recovery process that considers the slow input transitions from side pins. Thus, instead of a speed recovery process that is designed to replace lower leakage cells with higher leakage cells until conforming with a timing performance target, the improved leakage power recovery method addresses, or takes into account, the side transition times to strive for (if not achieve) the best leakage possible while preserving the timing of the circuit.

Unlike some conventional combined optimization tools, the novel system and method described herein operate with an accurate representation of the finished circuit design such that an iterative approach to leakage recovery is no longer required. Unlike the conventional power optimization tools that run in conjunction with a signoff analysis tool, no integration or additional costs or learning time is needed, coordination issues between the power optimization tool and the signoff analysis tool need not exist, and the leakage power recovery method readily adapts to requirements specific to a particular circuit design.

The illustrated embodiments of the leakage power recovery system and method are carried out as part of timing signoff. A signoff analysis tool, called Primetime®-SI (commercially available from Synopsis, Inc., of Mountain View, Calif.), will be referenced for purposes of describing the leakage power recovery system and method. In fact, most described embodiments of the leakage recovery system and method are carried out ancillary to or from within Primetime-SI®. However, those skilled in the pertinent art will recognize that the leakage power recovery method may be used with or in any conventional or later-developed signoff analysis tool.

In a portion of the leakage power recovery system and method, the timing of a circuit design is analyzed, and cells exhibiting a higher leakage (typically those having a lower threshold voltage, or $V_t$, sometimes referred to as Vth or vth) are replaced with cells exhibiting a lower leakage (typically those having a higher $V_t$) on paths with a positive timing margin, i.e., non-critical paths. The lower leakage cells are inherently slower to switch, but the leakage power recovery system and method can determine how many can be used in lieu of higher leakage cells without compromising performance targets. The leakage power recovery system and method is typically run on a circuit design late in the design process after the design timing is closed, in other words, after the circuit design has been determined to meet its performance goal. In one embodiment, higher leakage cells are replaced with lower leakage cells having an equivalent footprint as the higher leakage cells they replaced, such that replacement can occur without disturbing the layout routing at all. This can also include the side transition cells that have been replaced.

Figure 1:
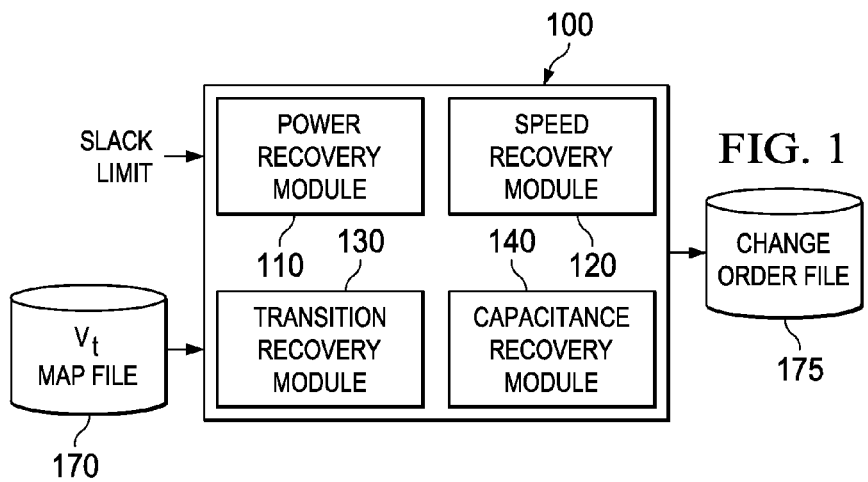
FIG. 1 illustrates a block diagram of an embodiment of a leakage power recovery system constructed according to the principles of the disclosure.

FIG. 1 illustrates a block diagram of an embodiment of a leakage power recovery system 100 constructed according to the principles of the disclosure. To perform the described functions, the leakage power recovery system 100 may be embodied as a series of operating instruction stored on a non-transitory computer-readable medium that directs the operation of a processor when, for example, initiated thereby. In one embodiment, the leakage power recovery system 100 may be a dedicated computing device including the necessary circuitry (including a processor and memory) or software to perform the described functions. In the illustrated embodiment, the leakage power recovery system 100 is implemented as part of a timing signoff tool and includes a power recovery module 110, a speed recovery module 120, a transition recovery module 130 and a capacitance recovery module 140.

The leakage power recovery system 100 receives a voltage threshold ($V_t$) map file 170 and a user-defined slack limit as inputs. The $V_t$ map file 170 includes different $V_t$ library names and cell suffixes with the suffixes for a given library name listed in order from those having the largest leakage (and the fastest timing) to those having the smallest leakage (and the slowest timing). The objective of the signoff analysis is to perform leakage recovery while ensuring that timing performance does not fall below the user-defined slack limit. This is done based on the order specified in the $V_t$ map file 170 that is received. A portion of an example of a $V_t$ map file such as $V_t$ map file 170 is as follows:

G65fp:FP g65p:P g65lp:LP
G65fpipo:FP g65pipo:P g65lpipo:LP

In the illustrated embodiment, the $V_t$ map file 170 is formatted such that one set of libraries is set forth per line. Each line contains a space separated list of library_name: vth_suffix ordered from the fastest, highest leakage celltype to the slowest, lowest leakage celltype.

In the embodiment of FIG. 1, the timing signoff tool performs a signoff analyses several times, typically for each of several so-called "corners." A corner represents particular assumptions regarding circuit fabrication or operating voltage or temperature variables. For example, variations in feature size and physical characteristics caused by expected variations in a normal fabrication process may cause $V_t$ to vary over the area of a given IC or from one IC to another. Likewise, variations in operating voltages or temperatures may cause cells to propagate transitions faster or slower. An analysis performed in a "slow corner" is therefore undertaken assuming that cells operate as slowly as possible given a normal fabrication variations and relatively low operating voltages and temperatures. Analyses may also be performed in average or fast corners. Corners may therefore be thought of as, e.g., worst, typical and best cases for analysis. All corners, and not just the process, voltage and temperature (PVT) corners described above, fall within the broad scope of the invention.

Each of the modules of the leakage power recovery system 100 is configured to carry out a particular process. The power recovery module 110 is configured to carry out a power recovery process and the speed recovery module 120 is configured to carry out a speed recovery process. Additionally, the transition recovery module 130 is configured to carry out a transition recovery process and the capacitance recovery module 140 is configured to carry out a capacitance recovery process. The speed recovery process, the transition recovery process and the capacitance recovery process are repeated in the corners until slacks in the circuit paths equal or exceed the user-defined slack limit.

Slack is defined as the difference between the arrival time for a transition to propagate from the start to the end of a particular path and the time required (i.e., required time) for a transition to propagate from the start to the end of the path. There may be many paths to each endpoint. The slowest timing path that terminates at the endpoint is considered the "critical path." A positive slack indicates the degree to which the particular path is faster than the required time. A negative slack indicates the degree to which the particular path is slower than the required time. A slack limit is a positive number that a user defines to be any desired value, e.g., 0.20 ns.

In one embodiment, the power recovery module 110 is configured to identify side transition cells of critical timing paths for replacement. As such, the power recovery module 110 is configured to consider transition times on side pins of cells that are involved in critical timing paths. Additionally, the power recovery module 110 is configured to analyze cells that have not been identified as "don't replace" to determine if they could be replaced to achieve better leakage optimization. The power recovery module 110 is configured to estimate slowdowns from delays to avoid timing updates and thereby reduce runtime. After all cells are processed, cell replacements are applied, and a timing update then occurs. After a timing update, timing failures, transition violations, and capacitance may then be determined. Timing failures may result from, for example, timing estimates that are based on limited factors (e.g., in input transition or output load), replaced cells that have different pin capacitance and drive capability and crosstalk effects that may not be accounted for during delay estimation.

Figure 5:
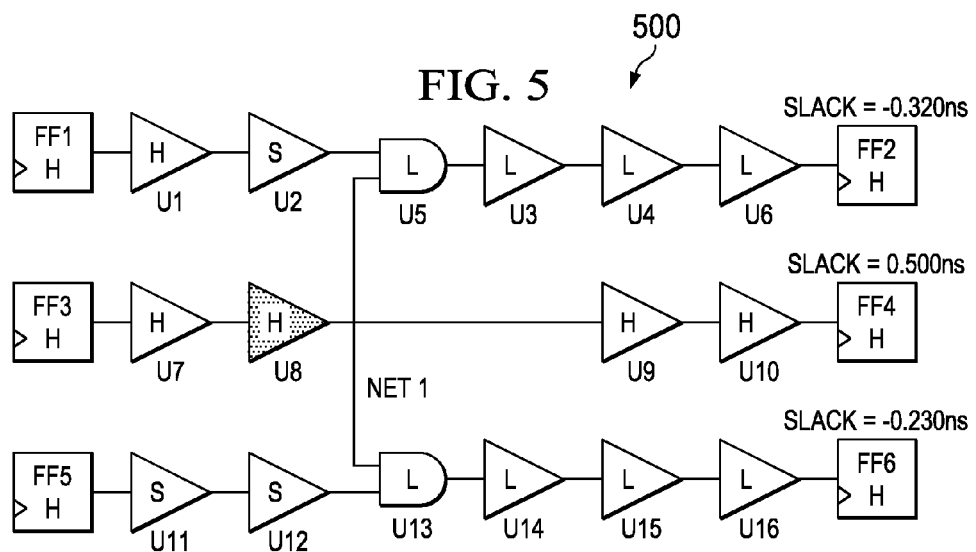
FIG. 5 is a schematic diagram of a portion of an example circuit illustrating operation of the speed recovery process of FIG. 3.

After the power recovery process has been carried out per the power recovery module 110, multiple iterations of the speed recovery process may be performed under the direction of the speed recovery module 120 to repair any timing that is below the user-defined slack limit. In one embodiment, the speed recovery module 120 is configured to change only one voltage threshold cell type per path. For example, turning to FIG. 5 which is a schematic diagram of a portion of an example circuit illustrating operation of the speed recovery process of FIG. 3. FIG. 5 is the same as FIG. 4 except FIG. 5 shows a violating slack value for the timing paths FF1 to FF2 and FF5 to FF6. When the worst timing path is processed (i.e., FF1 to FF2) bins of $V_t$ cells are generated (HVT, SVT and LVT for this path). After the HVT cells are changed to SVT and the slack estimate is updated, if the slack still fails, no other $V_t$ cell types are changed in the path. Instead, the other cells (SVT and LVT) of the path are processed to find any side input pins that contain slower transition times. These side input pins are examined to determine if the driver (i.e., the side transition cell) is the $V_t$ cell type being processed. If so, the driver is changed to address the side transition. An estimate of the side transition slack improvement will be applied.

For example, when processing the failing path from FF1 to FF2, the speed recovery module 120 is configured to loop through the $V_t$ sequence of changes (H to S, S to L). The speed recovery module 120 will first change U1 from H to S and then process remaining cells of the path FF1 to FF2 to examine side transitions. At this point, the speed recovery module 120 changes U8 from H to S since this side transition cell is contributing to the timing failure of path FF1 to FF2. Changes from the next $V_t$ cell type will occur if no changes from the previous $V_t$ type took place. For example, if no H changes occurred, S cells to L will take place. Accordingly, the speed recovery module 120 employs fewer high leakage cells during the speed recovery process.

After the speed recovery process, the transition and capacitance recovery processes are carried out by the transition recovery module 130 and the capacitance recovery module 140 to analyze any transition and capacitance violations that may have been introduced during the power recovery process. In the embodiment of FIG. 1, the transition recovery module 130 and the capacitance recovery module 140 are configured to perform conventional transition and capacitance recovery processes carried out in a signoff analysis tool. However, those skilled in the pertinent art will understand that later-developed transition and capacitance recovery processes fall within the broad scope of the invention.

The information generated in the signoff analysis of one corner can then be provided to other corners or analysis modes to allow subsequent speed, transition and/or capacitance recovery processes to be carried out in those corners or modes. In one embodiment, the leakage power recovery system 100 is configured to only perform speed, transition and capacitance recovery processes in the signoff analyses of additional corners besides the first corner processed. In an alternative embodiment, power recovery processes may also be carried out in the signoff analyses of additional corners. Repeating the power recovery process for multiple corners may be particularly advantageous for circuits having multiple modes of operation. The circuit is likely to have a corner, e.g., a slow corner, in each mode that would benefit from a power recovery process carried out according to the principles of the invention.

The end result may then be used to produce an engineering change order (ECO) file 175. The ECO file 175, if implemented, is expected to yield a circuit that exhibits at least some degree of leakage optimization while meeting the performance target.

Figure 2:
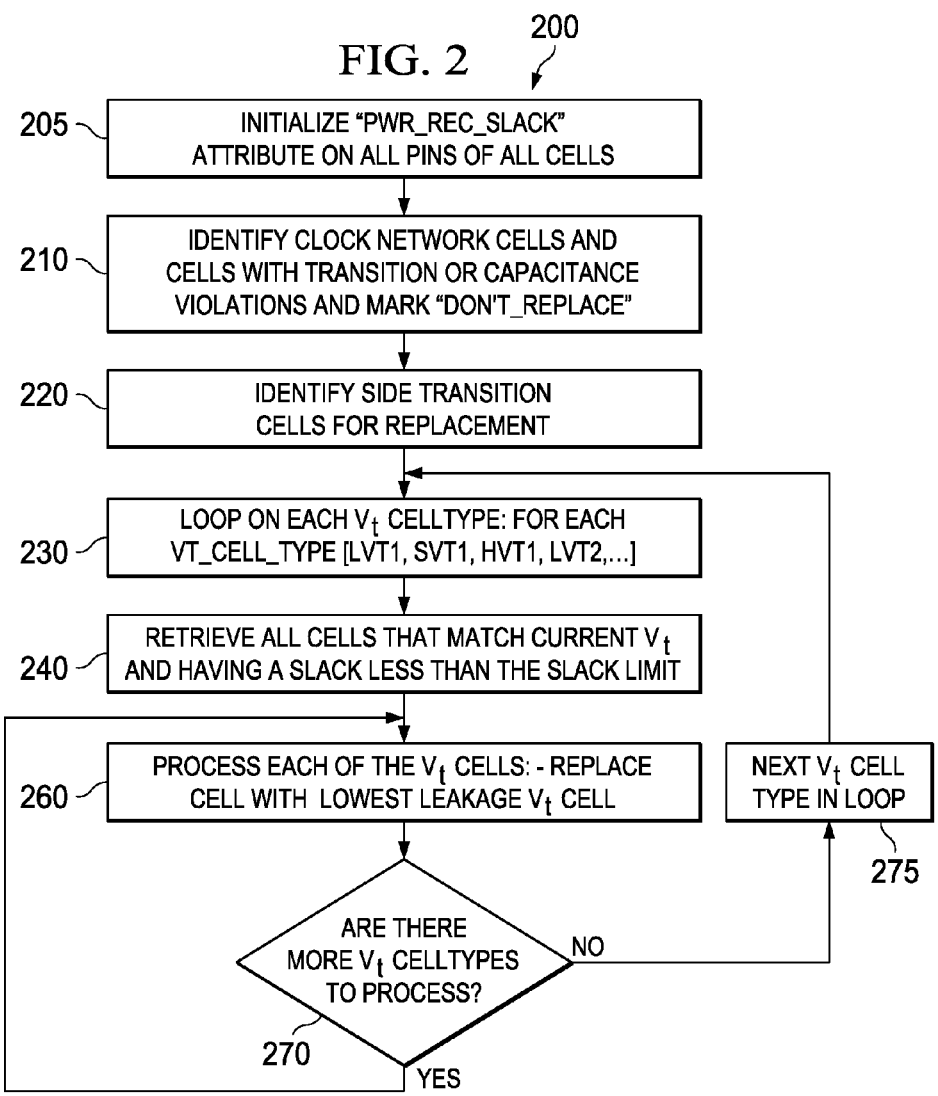
FIG. 2 illustrates a flow diagram of an embodiment of a power recovery process carried out according to the principles of the disclosure.

FIG. 2 is a flow diagram of one embodiment of a power recovery process 200 carried out according to the principles of the disclosure. The power recovery process 200 includes one effort level considered a high effort level. In other embodiments, power recovery processes may include additional effort levels that represent a tradeoff between runtime and leakage recovery improvement. Power recovery can take long runtimes, and some circuit designs can not accommodate long runtimes in their schedule. Other circuit designs are so power sensitive that long runtimes are always justified. Therefore, alternative embodiments may include at least two effort levels, such as a high effort level and a lower effort level.

In general, the power recovery process 200 examines cells in the design and their timing slack to determine if cells can be replaced with lower leakage cells without reducing the timing slack below the user-defined slack limit. In determining cells to be replaced, the power recovery process 200 considers slow input transition times on side pins of critical timing paths of the design.

First, in a step 205, every pin in the $V_t$ map file 170 of FIG. 1 is initialized with an attribute called "pwr_rec_slack." This attribute contains the worst timing slack value (rise or fall) that any timing path through that pin encounters.

After the design is initialized with these "pwr_rec_slack" attributes in the step 205, clock network cells and cells with transition or capacitance violations, e.g., those that have an initial starting timing slack below the user-defined slack limit or cells that are unconstrained, are identified in a step 210. A cell that is unconstrained does not contain a timing slack value since it is constrained in another mode of analysis. Every such cell is marked "don't_replace" in step 210; cells not marked "don't_replace" are then processed.

In a step 220, side transition cells of critical paths are identified for replacement. The side transition cells are identified to be changed, i.e., replaced with a Vth cell having a faster transition. A faster transition for a side transition cell propagates forward and provides an improved timing margin such that a larger collection of cells can be considered for more improved circuit power reduction. The identified cells are also replaced in step 220 and marked so that they will not be replaced in the following loop.

In one embodiment, the side transition cells are identified for replacement based on a heuristic or a set of heuristics. A heuristic is a strategy or rules employed to solve a problem. In one embodiment, the identification of the side transition cells for replacement may be based on at least one heuristic including a transition limit or threshold, a number of connections to the side transition cell and the type of connections coupled to the side transition cell. An additional heuristic for replacement includes the number of cells in the fanout of the weak side transition cell.

In one embodiment, weak cells in a circuit design are identified and the fanout of each weak cell is examined to determine if the weak cell is a driver for an input of any multi-input cells on critical timing paths where the input transition is the contributing (e.g., slowest) transition to the output transition of the critical timing path cell. If so, the identified weak cell is upsized for a faster transition. A weak cell that does not drive multi-input cells on critical timing paths is not changed in order to preserve its dynamic power benefits.

A loop is undertaken in a step 230 for each $V_t$ cell type except for cells of the last cell type (e.g., the lowest leakage cell type). All cells of that cell type are retrieved from the $V_t$ map file 170 in a step 240. For lower effort levels, the cells are sorted by slack. For example, the cells are sorted by ascending slack, such that those having the least (worst) slack are at the top of the list and those having the greatest slack are at the bottom of the list. A stopping condition is then employed to limit cell replacements based upon a desired level of effort.

For the high effort level, it has been seen that on many circuit designs better power recovery results can be obtained by converting all cells (except clock network cells, the side transition cells identified for replacement and those having slacks that are greater than the user-defined slack limit) to be the lowest leakage $V_t$ cells in a step 260. In doing so, the timing performance of the design shows many more violating paths that need to be repaired in the speed recovery process. Since the speed recovery process processes timing paths, it has more accurate information, such as transition rise and fall delays and timing slacks. This more accurate data allows a better leakage recovery result with this high effort approach. However, this is typically achieved at the cost of additional runtime. The loop is repeated via the decisional step 270 and the step 275 for each cell of that cell type and then for each cell type in the circuit until all cells of all cell types have been processed.

The result of the power recovery process is a list of cell replacements that should be implemented. The timing of the circuit design is then updated. This update likely causes timing (speed) violations, transition violations and capacitance violations. At this stage multiple iterations of speed recovery are performed to repair any timing that is below the user-defined slack limit.

Embodiments of the Speed Recovery Process

Figure 3:
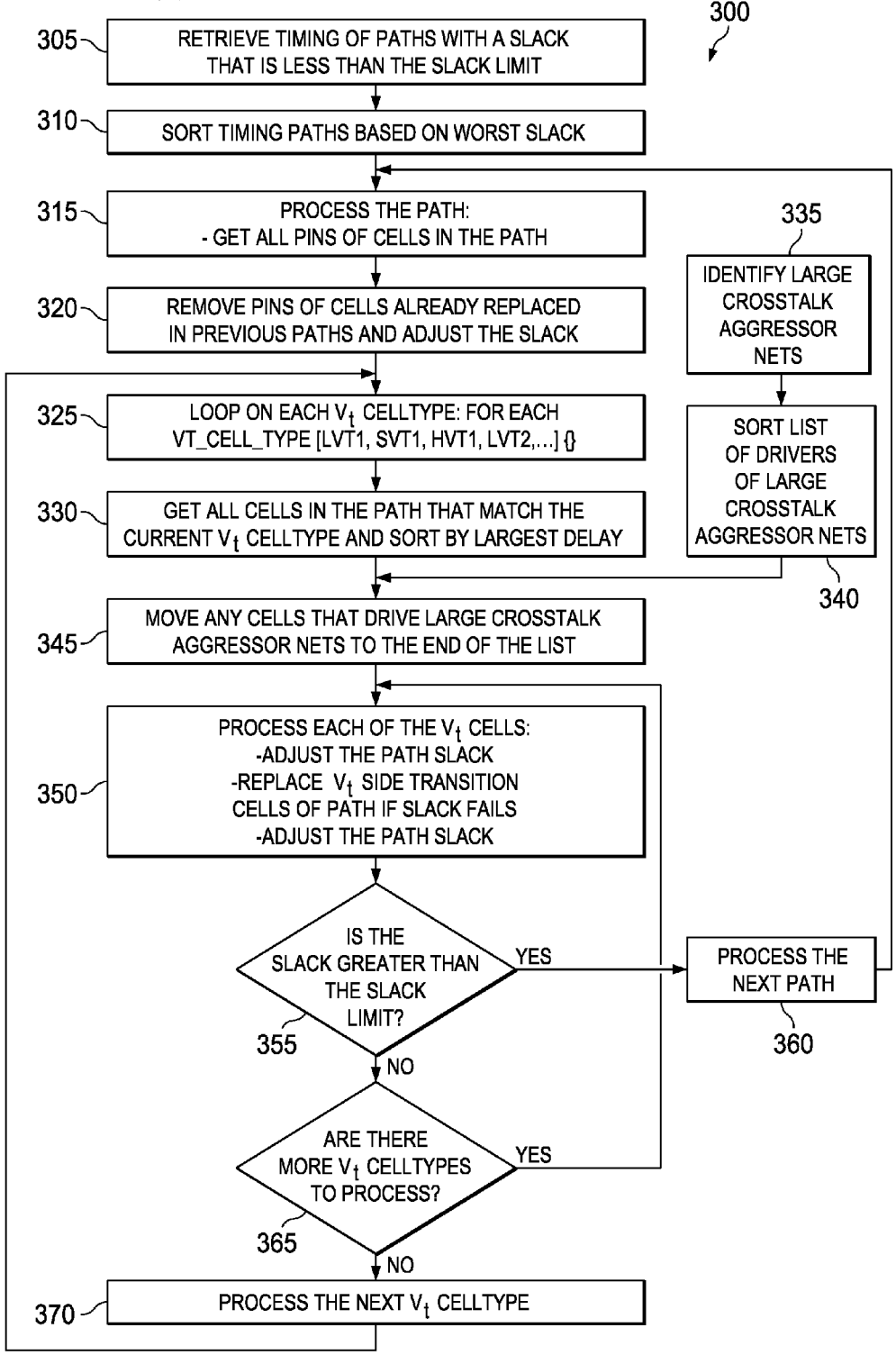
FIG. 3 illustrates a flow diagram of an embodiment of a speed recovery process carried out according to the principles of the disclosure.

FIG. 3 is a flow diagram of one embodiment of a speed recovery process 300 carried out by the speed recovery module 120 of FIG. 1. The illustrated embodiment of the speed recovery process analyzes failing paths to perform footprint-equivalent $V_t$ cell replacements to repair the timing of the design while preserving the best leakage power. The speed recovery process 300 also considers side transitions cells. As such, the speed recovery process can use fewer high leakage cells for speed recovery in contrast to conventional processes. The speed recovery process 300 can support any number of $V_t$ cell types, but this example is limited to the three cell types of FIG. 3.

The speed recovery process retrieves the timing of failing paths in a step 305 and sorts the failing paths for each clock group by worst (least) timing slack in a step 310. For each path, the pins of the cells in the path are retrieved in a step 315. Pins of cells already replaced by the speed recovery process (due to their being in previously processed paths) are removed in a step 320, and the slack is adjusted accordingly. In a step 325, a loop is undertaken for each $V_t$ cell type in the path. Information regarding all cells in the path of a given $V_t$ cell type are retrieved in a step 330 and sorted into a list based on delay. In the illustrated embodiment, the cells are sorted by descending delay.

The illustrated embodiment of the speed recovery process also takes into consideration cells that are crosstalk aggressors of crosstalk victim nets. The cells that drive crosstalk aggressor nets (those having crosstalk exceeding a threshold) are handled differently to minimize the introduction of additional crosstalk delay variation on victim nets, which can degrade timing. Those skilled in the pertinent art are aware of how to calculate the degree to which nets are responsible for crosstalk with adjacent nets.

Before processing the failing paths of the circuit design, an analysis is done in a step 335 to identify the largest crosstalk aggressor nets of victim nets involved in failing timing paths. Input for the step 335 can be provided from a static timing analysis tool that performs crosstalk analysis. The static timing analysis tool can be running simultaneously with the method 300. In some embodiments, step 335 can be performed after completion of step 330. Large crosstalk aggressor nets are sorted in a step 340. In a step 345, the cells that drive the large aggressor nets are moved to the bottom of the sorted list. In the illustrated embodiment, crosstalk aggression is used as a cost factor when processing paths to determine the best candidates to replace faster cells with higher leakage and discourages the replacement of a cell that is an aggressor to many victim nets.

The speed recovery process 300 continues to step 350 and processes the failing timing paths considering the side transition times of critical timing paths. In one embodiment, a single voltage threshold cell type change is done per path. For example, in FIG. 5 when the worst timing path is processed (FF1 to FF2) bins of $V_t$ cells are generated (H and S for this path). After the H cells are changed to S and the slack estimate is updated, if the slack still fails, no other $V_t$ cell types are changed in the path. Instead, all of the other cells (S and L cells) of the path are processed to find any side input pins that contain slower transition times. These side input pins are examined to determine if the driver (i.e., a side transition cell) has the $V_t$ cell type being processed. If so, the identified driver is changed to address the side transition. An estimate of the side transition slack improvement is applied.

Turning to FIG. 5, when processing the failing path from FF1 to FF2, the speed recovery process 300 loops through the $V_t$ sequence of changes from slower lower leakage cells to higher leakage cells (e.g., H to S, S to L) and first changes U1 from H to S. The speed recovery process 300 then processes remaining cells of the path FF1 to FF2 to examine side transitions. At this point, the speed recovery process 300 changes U8 from H to S since this side transition is contributing to the timing failure of the FF1 to FF2 path. Changes from the next $V_t$ cell type occurs if no changes from the previous $V_t$ type took place. For example, if no H changes occurred, changing S cells to L cells will take place.

Additional cells are processed unless the timing slack becomes greater than the user-defined slack limit (as determined in the decisional step 355, which reiterates the loop via the step 360). This ensures the minimum number of replacements to higher leakage cells are made, while still meeting the timing performance target.

The delay improvement estimate is stored on the output pin of the cell scheduled to be replaced. This is done so that if this cell is involved in other timing paths the slack can be adjusted before any new cells in the timing path are processed. When the cells, except for the side transition cells that were changed, in a path are being processed, a cell is replaced only if it was changed previously during the power recovery process. This is to ensure that hold violations are not introduced.

After all the "H" cells are processed in the path being examined, all the next cell type ("S" cell type) will then be processed via the decisional step 365 and the step 370. The speed recovery process 300 only changes cell types by one level. This is because it is working on delay estimates and a timing update is required to get an accurate assessment of the timing performance of the design. After the failing paths are processed, the scheduled replacements are performed, and a timing update occurs.

In the illustrated embodiment of the method 300, multiple iterations of the speed recovery routine are run to repair the entire timing of the circuit design. To reduce runtime, the number of failing paths processed may be chosen carefully. Processing all failing paths may consume too much runtime and lead to diminishing improvement if many of the cells in the failing paths have been processed earlier. This can also be design-specific as some designs may have deep combinational logic (such as multiplexing) to specific endpoints.

The speed recovery process may use different techniques to handle the number of failing paths to process. In one embodiment, the speed recovery process collects failing paths based on a limit of 1 million paths per clock group, and a limit of 30 paths per endpoint flip flop (these parameters can be changed by the user based on cell type of design). In another embodiment, the speed recovery process collects failing paths based on the start flip flop to end flip flop pair connectivity. In the latter embodiment, only one path per start flip flop to end flip flop pair is obtained. Due to the number of flip flops in a circuit design this can result in a large number of paths. In either case a limit on the maximum paths processed per iteration is used (default 500,000). In yet another embodiment, the speed recovery process alternates between these two techniques for each iteration of the speed recovery process. This yields a relatively robust technique for path collection that covers various design structures.

After all the speed recovery process iterations are complete the timing should be repaired to the user-defined slack limit. In some cases, due to timing window shifts arising from cell replacements, additional crosstalk delay variation may be seen on certain paths. For example, a path may have been put back to the identical cell types prior to the leakage recovery speed recovery process being run but fail timing due to additional crosstalk delay variation. To handle this situation, additional speed recovery iterations can be run ignoring the function of only changing cells that were replaced originally during the power recovery process. This will repair any remaining timing issues, but hold timing must be checked to ensure a hold issue is not introduced.

Transition and Capacitance Recovery

After the speed recovery portion is completed the speed recovery process identifies any transition and capacitance violations that were introduced by cell replacement performed during the power recovery process. The driver cells on transition violations are replaced with cells that have sharper transition times. Similarly cells with maximum capacitance violations are changed back to cells that can drive a larger load.

When the speed recovery process is completed at the single PVT corner, information such as cell changes can be output so the speed recovery process can be run at the next corner/mode in speed recovery only mode. This enables any timing failures seen at these other corners to be repaired. When all desired corners are completed, the changes can be implemented. Since these changes are footprint equivalent modifications, the layout routing is not disturbed.

The above-described apparatuses and methods may be embodied in or performed by various conventional digital data processors or computers, wherein the computers are programmed or store executable programs of sequences of software instructions to perform one or more of the steps of the methods, e.g., steps of the method of FIG. 2 or FIG. 3. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 2 of FIG. 3, or functions of the apparatuses described herein. Additionally, an apparatus, such as an EDA tool, may be designed to include the necessary circuitry to perform each step of the methods of FIG. 2 or FIG. 3. As disclosed herein, the EDA tool can be a timing sign-off tool. An STA tool can include the operating instructions, circuitry or combination thereof for performing the methods described herein. As such, the disclosed methods can employ timing signoff quality data.

Certain embodiments of the invention further relate to computer storage products with a non-transitory computer-readable medium that have program code thereon for performing various computer-implemented operations that embody the tools (e.g., the leakage power recovery system of FIG. 1) or carry out the steps of the methods (e.g., the methods 200 and 300 of FIG. 2 and FIG. 3) set forth herein. Non-transitory used herein refers to all computer-readable media except for transitory, propagating signals.

The media and program code may be those specially designed and constructed for the purposes of the invention, or they may be of the kind well known and available to those having skill in the computer software arts. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A leakage power recovery system, comprising:
a power recovery module configured to consider side transitions when making a first conditional replacement of a cell in at least one path in a circuit design with a lower leakage cell and estimate delays and slack of said at least one path of said circuit design, wherein said consideration of side transitions includes considering a contributing transition of a cell that is input to a multiple input cell in said at least one path; and
a speed recovery module associated with said power recovery module and configured to make a second conditional replacement of a slower lower leakage cell of said at least one path with a higher leakage cell when there is a timing violation with respect to said at least one path, determine if any other cells of said at least one path has a slower input transition and make a third conditional replacement of a driver thereof to a faster higher leakage cell when said driver is one of said slower lower leakage cells.

2. The system as recited in claim 1 wherein at least one of said side transitions provides a slowest input transition for a multi-input cell on a critical timing path of said circuit design.

3. The system as recited in claim 1 wherein said power recovery module is further configured to retrieve information regarding said cells from a threshold voltage map file.

4. The system as recited in claim 1 wherein said power recovery module exempts at least one type of cell from said first conditional replacement selected from the group consisting of:
    clock network cells,
    cells having transition violations, and
    cells having capacitance violations.

5. The system as recited in claim 1 wherein said power recovery module is further configured to make said first conditional replacement using a lower leakage cell having substantially equivalent footprint area.

6. The system as recited in claim 1 wherein said cells include at least three voltage threshold cell types for at least one cell function three cell types.

7. The system as recited in claim 1 wherein said circuit design is an integrated circuit design.

8. The system as recited in claim 1 wherein said power recovery module is configured to replace a side transition driver associated with said at least one circuit path with another higher leakage cell based on considering said side transitions.

9. The system as recited in claim 1 wherein said power recovery module is configured to replace a side transition driver associated with said at least one path based on a predefined heuristic.

10. The system as recited in claim 9 wherein said predefined heuristic has a basis selected from the group consisting of:
    a transition limit,
    a number of connections to said side transition cell,
    type of connections coupled to said side transition cell, and
    a number of cells in a fanout of a weak side transition cell.

11. The system as recited in claim 1 wherein said power recovery module and said speed recovery module are embodied in program code stored on a non-transitory computer-readable medium.

12. A leakage power recovery method, comprising:
    considering, employing a processor, side transitions when making a first conditional replacement of a cell in at least one path in a circuit design with a lower leakage cell, wherein said considering side transitions includes considering a contributing transition of a cell that is input to a multiple input cell in said at least one path;
    estimating delays and slack of said at least one path of said circuit design;
    determining if there is a timing violation with respect to said at least one path;
    making a second conditional replacement of a slower lower leakage cell of the at least one path with a higher leakage cell when there is a timing violation with respect to said at least one path;
    determining if any other cells of the at least one path has a slower input transition; and
    making a third conditional replacement of a driver thereof to a faster higher leakage cell when said driver is one of said slower lower leakage cells.

13. The method as recited in claim 12 wherein at least one of said side transitions provide a slowest input transition for a multi-input cell on said critical timing path.

14. The method as recited in claim 12 further comprising retrieving information regarding said cells from a $V_t$ map file.

15. The method as recited in claim 12 further comprising exempting clock network cells and cells having transition or capacitance violations from said first conditional replacement.

16. The method as recited in claim 12 further comprising making said first conditional replacement using a lower leakage cell having an equivalent footprint area.

17. The method as recited in claim 12 wherein said cells are of at least three cell types.

18. The method as recited in claim 12 wherein said circuit design is an integrated circuit design.

19. The method as recited in claim 12 further comprising changing a side transition driver associated with said at least one circuit path with another higher leakage cell based on said considering said side transitions.

20. The method as recited in claim 12 further comprising replacing a side transition driver associated with said at least one path based on predefined heuristics.

21. The method as recited in claim 12 wherein at least a portion of said method is performed during timing signoff analysis of said circuit design.

22. An electronic design automation tool, comprising:
    circuitry for considering side transitions when making a first conditional replacement of a cell in at least one path in a circuit design with a lower leakage cell, wherein said considering side transitions includes considering a contributing transition of a cell that is input to a multiple input cell in said at least one path;
    circuitry for estimating delays and slack of said at least one path of said circuit design;
    circuitry for determining if there is a timing violation with respect to said at least one path;
    circuitry for making a second conditional replacement of a slower lower leakage cell of the at least one path with a higher leakage cell when there is a timing violation with respect to said at least one path;
    circuitry for determining if any other cells of the at least one path has a slower input transition; and
    circuitry for making a third conditional replacement of a driver thereof to a faster higher leakage cell when said driver is one of said slower lower leakage cells.

* * * * *